United States Patent Office 2,996,392
Patented Aug. 15, 1961

2,996,392
OPTICAL GLASS
Heinz Bromer, Hermannstein, and Norbert Meinert, Wetzlar (Lahn), Germany, assignors to Ernst Leitz, G.m.b.H., Wetzlar (Lahn), Germany, a corporation of Germany
No Drawing. Filed Apr. 16, 1958, Ser. No. 728,768
9 Claims. (Cl. 106—47)

Optical glasses are known which besides a high index of refraction $n_e = 1.65$ exhibit a low dispersion. Boric oxide is generally used in these glasses as the glass former. Furthermore these glasses contain considerable amounts of oxides of the rare earths, for example lanthanum oxide, and occasionally thorium oxide.

These glasses are, because of their high refraction and low dispersion, especially desired for optical calculations because they permit longer radii of curvature with such refractive index than with glasses of lower index of refraction, whereby the correction of the total abberrations is essentially facilitated.

Thorium containing glasses, because of their radioactive radiation, are, indeed, workable only under special precautionary measures and in part are of very limited use. Each of these glasses have, however, the disadvantage that their stability and resistance to weathering influences leave much to be desired. Especially, these characteristics make themselves noticeably unpleasant in the working of the glasses.

It has already been proposed to add silica to glasses of this type in amounts up to 12 percent by weight in order to increase their stability, but without thereby attaining any substantial improvement.

We have now found that glasses which are melted from boric oxide and lanthanum oxide become practically completely insensible when they contain at least 10 percent by weight of aluminum oxide. A further addition of bivalent oxides has proved of advantage. Further, up to 10 percent by weight of zirconium oxide or tantalum oxide or both can be added to these glasses.

Glasses of the following composition have shown themselves to be particularly insensitive:

| | Percent by weight |
|---|---|
| $B_2O_3$ | 16–32 |
| $Al_2O_3$ | 10–23 |
| $La_2O_3$ | 25–50 |
| Bi-valent oxides | 8–50 |

Additionally, as already mentioned, further oxides, particularly zirconium oxide and tantalum oxide, can be used in amounts up to about 10 percent by weight.

In the following table some glasses according to the invention are given by way of example.

Glasses of the above type show, when treated with nitric acid, a stability of at least two orders of magnitude above the known glasses mentioned in the introductory paragraphs. These glasses may be melted down in the given proportions in platinum crucibles at temperatures of about 1200° C. to 1300° C. and worked at temperatures down to about 1000° C. The crude optical glass of the above melts can be cooled in suitable cooling process of the usual type, grinding and polishing operations be worked to finished glass.

Having described our invention, we claim:

1. Optical glass containing, as glass former, from 16 to 32 percent by weight of boric oxide, from 25 to 50 percent by weight of lanthanum oxide and from 10.4 to 23 percent by weight of aluminum oxide.
2. Optical glass of claim 1 containing additionally from 8 to 40 percent by weight of an oxide of a bi-valent element.
3. Optical glass of claim 1 containing up to 10 percent by weight of zirconium oxide.
4. Optical glass of claim 1 containing up to 10 percent by weight of tantalum oxide.
5. Optical glass containing the following:

| | Percent by weight |
|---|---|
| $B_2O_3$ | 16 to 32 |
| $Al_2O_3$ | 10.4 to 23 |
| $La_2O_3$ | 25 to 50 |
| Oxides of bi-valent elements | 8 to 46 |
| $ZrO_2$ | up to 10 |
| $Ta_2O_5$ | up to 10 | in which the sum of the percentages of $B_2O_3$ and $Al_2O_3$ amounts to at least 29 percent by weight.

6. Optical glass comprising a molten mixture of a glass base consisting of boron oxide, lanthanum oxide and aluminum oxide, the percentage by weight of said glass base being from 49.9% to 87.8% of the glass, the range of percentage by weight of the constituents in the glass base being as follows: boron oxide 16–32%, aluminum oxide 10.4–23% and lanthanum oxide 25–50%, the balance of the glass comprising oxides of the group of metals consisting of zirconium, tantalum and bivalent metals.
7. The optical glass of claim 6 in which the percent by weight of bivalent metals may be from 8% to 50% of the total weight of the glass.
8. The optical glass of claim 7 in which the percent of ziconium oxide and of tantalum oxide is less than the percent of bivalent metal oxides.
9. The optical glass of claim 6 in which the bivalent metal oxides are oxides of the group of metals consisting essentially of calcium, magnesium, barium and cadmium.

Table in percent by weight

| Melt No. | $B_2O_3$ | $Al_2O_3$ | $La_2O_3$ | CaO | MgO | BaO | $ZrO_2$ | CdO | $Ta_2O_5$ | $n_e$ | $\nu$ | $\vartheta$ | $\Delta\nu$ |
|---|---|---|---|---|---|---|---|---|---|---|---|---|---|
| EL 15 | 25.2 | 21.0 | 40.3 | 13.5 | | | | | | 1.6837 | 53.2 | 547 | −4.0 |
| EL/T 1 | 26.4 | 21.9 | 37.6 | 14.1 | | | | | | 1.6742 | 53.6 | 548 | −3.0 |
| EL 16 | 25.4 | 21.2 | 33.8 | 13.6 | | | 6.0 | | | 1.6875 | 52.0 | 547 | −5.2 |
| EL 26 | 29.7 | 15.1 | 37.3 | 12.7 | | | 5.2 | | | 1.6964 | 52.7 | 544 | −6.2 |
| Vers. Ca | 29.8 | 15.2 | 37.5 | 12.8 | | | 4.7 | | | 1.7012 | 52.2 | | |
| EL 17 | 25.1 | 21.0 | 33.6 | 13.4 | | | | | 6.9 | 1.6855 | 51.7 | 550 | −3.8 |
| EL 12 | 22.9 | 16.3 | 10.7 | | | 50.1 | | | | 1.6530 | 53.2 | | |
| EL 9 | 17.0 | 12.4 | 39.6 | | | | | 31.0 | | 1.7690 | 44.2 | 560 | −5.4 |
| EL 27 | 30.8 | 15.7 | 38.6 | | 9.5 | | 5.4 | | | 1.6842 | 53.5 | 543 | −6.0 |
| EL 28 | 26.0 | 13.2 | 48.2 | | 8.1 | | 4.5 | | | 1.7084 | 52.2 | 546 | −5.5 |
| EL 29 | 29.8 | 15.3 | 37.4 | 3.1 | 9.2 | | 5.2 | | | 1.6886 | 53.2 | 544 | −5.7 |
| EL 30 | 29.1 | 10.5 | 44.5 | 3.4 | 8.2 | | 4.4 | | | 1.7093 | 52.7 | 547 | −4.5 |
| EL 31 | 29.8 | 10.4 | 45.6 | 3.5 | 8.5 | | 2.2 | | | 1.7007 | 43.8 | 545 | −4.5 |
| EL 32 | 30.5 | 10.7 | 46.6 | 3.6 | 8.6 | | | | | 1.6944 | 54.2 | 543 | −5.2 |

References Cited in the file of this patent

FOREIGN PATENTS 493,137    Canada _____ May 26, 1953